United States Patent
Chinnakkannu et al.

(10) Patent No.: US 11,564,269 B2
(45) Date of Patent: Jan. 24, 2023

(54) VIRTUALIZATION OF CELLULAR CONNECTION AS WIRELESS LOCAL AREA NETWORK CONNECTION

(71) Applicant: GOOGLE LLC, Mountain View, CA (US)

(72) Inventors: Jayachandran Chinnakkannu, Santa Clara, CA (US); Amruth Ramachandran, Cupertino, CA (US); Shivank Nayak, Milpitas, CA (US); Chinmay Dhodapkar, San Diego, CA (US)

(73) Assignee: GOOGLE LLC, Mountain View, CA (US)

( * ) Notice: Subject to any disclaimer, the term of this patent is extended or adjusted under 35 U.S.C. 154(b) by 38 days.

(21) Appl. No.: 16/866,495

(22) Filed: May 4, 2020

(65) Prior Publication Data

US 2021/0185745 A1    Jun. 17, 2021

Related U.S. Application Data

(60) Provisional application No. 62/947,439, filed on Dec. 12, 2019.

(51) Int. Cl.
*G06F 9/455* (2018.01)
*H04W 8/18* (2009.01)
(Continued)

(52) U.S. Cl.
CPC ........ *H04W 76/14* (2018.02); *G06F 9/45558* (2013.01); *H04W 8/20* (2013.01); *G06F 2009/45595* (2013.01); *H04W 84/12* (2013.01)

(58) Field of Classification Search
CPC ....... H04W 76/14; H04W 8/20; H04W 84/12; H04W 88/06; H04W 8/183; H04W 88/04;
(Continued)

(56) References Cited

U.S. PATENT DOCUMENTS 9,241,367 B2    1/2016    Chen et al.
9,775,022 B1    9/2017    Sahu et al.
(Continued)

FOREIGN PATENT DOCUMENTS

WO    2015180140    12/2015

OTHER PUBLICATIONS

International Search Report and Written Opinion dated Apr. 13, 2021 for PCT/US2020/064034, 13 pages.

*Primary Examiner* — Joseph E Dean, Jr.

(57) ABSTRACT

A user equipment includes a radio frequency (RF) modem configured to wirelessly communicate with at least one mobile network operator and a wireless local area network (WLAN) modem configured to wirelessly communicate with at least one WLAN access point. The user equipment further includes a processor coupled to the RF modem and the WLAN modem and at least one memory storing executable instructions. The executable instructions are configured to manipulate at least one of the processor and the RF modem to establish a first cellular connection with a first mobile network operator based on a first subscription represented by a first subscriber identity, and virtualize the first cellular connection as a wireless local area network (WLAN) connection for use by one or more processes executed by the processor for a second subscription represented by a second subscriber identity.

21 Claims, 7 Drawing Sheets

(51) Int. Cl.
*H04W 76/14* (2018.01)
*H04W 8/20* (2009.01)
*H04W 84/12* (2009.01)

(58) Field of Classification Search
CPC ............... H04W 76/16; G06F 9/45558; G06F 2009/45595
See application file for complete search history.

(56) References Cited

U.S. PATENT DOCUMENTS

| | | |
|---|---|---|
| 10,362,617 B2 | 7/2019 | Sema et al. |
| 2006/0161771 A1* | 7/2006 | Zhang .................. H04L 9/0844 713/168 |
| 2019/0098487 A1 | 3/2019 | David |
| 2019/0306898 A1* | 10/2019 | Goddeti ................ H04W 76/12 |

\* cited by examiner

VIRTUALIZATION OF CELLULAR CONNECTION AS WIRELESS LOCAL AREA NETWORK CONNECTION

CROSS-REFERENCE TO RELATED APPLICATIONS

The present application claims priority to U.S. Patent Application Ser. No. 62/947,439, entitled "VIRTUALIZATION OF CELLULAR CONNECTION AS WIRELESS LOCAL AREA NETWORK CONNECTION" and filed on Dec. 12, 2019, the entirety of which is incorporated by reference herein.

BACKGROUND

Cellular phones, tablet computers, and other wireless communication devices frequently are configured to support multiple mobile subscriber connections, such as through hardware and software support for multiple subscriber information modules (SIMs). To illustrate, one SIM may be used to establish a subscriber cellular connection for voice services with one mobile network operator and another SIM is then used to establish a separate subscriber cellular connection with a different mobile network operator for data services. As another example, one SIM may be used for the user's primary, or default, mobile subscription, while another SIM is used to provide an alternative subscriber connection when the wireless communication device is no longer able to connect with the network provided by the primary mobile network operator; that is, the wireless communication device is "roaming" outside the range of the primary mobile network operator.

SUMMARY OF EMBODIMENTS

In accordance with one aspect, a system includes a user equipment configured to virtualize a cellular connection established with a mobile network operator based on a first subscriber identity as a virtual wireless local area network (WLAN) access point for use by one or more processes executing at the user equipment that are associated with a second subscriber identity. In some embodiments, the user equipment is configured to virtualize the cellular connection by establishing a mobile hotspot for the cellular connection and providing a WLAN interface for the mobile hotspot for use by the one or more processes. The user equipment can be further configured to determine one or more cellular signal quality parameters for the cellular connection, determine one or more equivalent WLAN signal quality parameters based on the one or more cellular signal quality parameters, and represent the mobile hotspot as a virtual WLAN access point having the determined one or more equivalent WLAN signal quality parameters. The one or more processes can include, for example, at least one of a Voice-over-Internet Protocol (VoIP) process, a messaging process, and a Session Initiation Protocol (SIP) process.

In accordance with another aspect, a method includes establishing a first cellular connection between a user equipment and a first mobile network operator based on a first subscription represented by a first subscriber identity of the user equipment. The method further includes virtualizing the first cellular connection as a WLAN connection for use by one or more processes executed at the user equipment for a second subscription represented by a second subscriber identity of the user equipment. In some embodiments, virtualizing the first cellular connection as the WLAN connection includes establishing a mobile hotspot at the user equipment for the first cellular connection, providing a WLAN interface for the mobile hotspot for use by a network protocol stack executed at the user equipment in association with the second subscription, and wherein the one or more processes communicate with a second mobile network operator using a data path that includes the WLAN interface and the first cellular connection. The method further can include establishing, for the one or more processes, a secure tunnel with the second mobile network operator via the WLAN interface and the first cellular connection. In some implementations, providing the WLAN interface includes providing the WLAN interface as a set of one or more application programming interfaces (APIs) for an operating system executing at the user equipment.

The method also can include monitoring, at the user equipment, at least one cellular signal quality parameter of the first cellular connection and determining, at the user equipment, at least one equivalent WLAN signal quality parameter for a virtual WLAN access point representing the first cellular connection based on the at least one cellular signal quality parameter. The method further may include monitoring a WLAN modem of the user equipment to identify one or more second WLAN access points available to connect to the user equipment, determining at least one WLAN signal quality parameter of each of the identified one or more second WLAN access points, selecting one of the one or more second WLAN access points or the virtual WLAN access point for establishing a WLAN connection for the user equipment based on the WLAN signal quality parameters of the one or more second WLAN access points and the at least one equivalent WLAN signal quality parameter for the virtual WLAN access point, and wherein virtualizing the first cellular connection as the WLAN connection comprises virtualizing the first cellular connection responsive to selecting the virtual WLAN access point for establishing the WLAN connection. The method also can include displaying a graphical representation of the at least one equivalent WLAN signal quality parameter at a display screen of the user equipment.

In some implementations, virtualizing the first cellular connection as the WLAN connection includes virtualizing the first cellular connection as the WLAN connection responsive to at least one of: the user equipment being unable to establish a second cellular connection with a second mobile network operator using the second subscription; or use of the second cellular connection by the one or more processes being impracticable for reasons of cost or power consumption. Further, in some implementations, the first cellular connection is a cellular connection established using at least one of: a Long Term Evolution (LTE) radio access technology (RAT), a Fifth Generation New Radio (5G NR) radio access technology, a Global System for Mobility (GSM) radio access technology, and a Universal Mobile Telecommunications System (UMTS) radio access technology, and the WLAN connection is a wireless connection established using at least one of: a WiFi radio access technology, a Bluetooth radio access technology, and an Ultra-Wide Band radio access technology.

In accordance with yet another aspect, a user equipment includes a radio frequency (RF) modem configured to wirelessly communicate with at least one mobile network operator, a WLAN modem configured to wirelessly communicate with at least one WLAN access point, and a processor coupled to the RF modem and the WLAN modem. The user equipment further includes at least one memory storing executable instructions, the executable instructions configured to manipulate at least one of the processor and the RF modem to establish a first cellular connection with a first mobile network operator based on a first subscription represented by a first subscriber identity; and virtualize the first cellular connection as a WLAN connection for use by one or more processes executed by the processor for a second subscription represented by a second subscriber identity. In some implementations, the executable instructions to manipulate at least one of the processor or the RF modem to virtualize the first cellular connection as the WLAN connection include executable instructions to manipulate at least one of the processor or the RF modem to establish a mobile hotspot at the user equipment for the first cellular connection, provide a WLAN interface for the mobile hotspot for use by a network protocol stack executed at the user equipment in association with the second subscription, and wherein the one or more processes are to communicate with a second mobile network operator using a data path that includes the WLAN interface and the first cellular connection. In some embodiments, the executable instructions further include executable instructions to manipulate at least one of the processor or the RF modem to establish, for the one or more processes, a secure tunnel with the second mobile network operator via the WLAN interface and the first cellular connection. In some embodiments, the first cellular connection is virtualized as the WLAN connection responsive to a second cellular connection with a second mobile network operator using the second subscription being either unavailable or impractical for use. Still further, in some embodiments the user equipment further includes a first integrated circuit (IC) card interface configured to receive a first IC card storing a representation of the first subscriber identity and a second IC card interface configured to receive a second IC card storing a representation of the second subscriber identity.

In some implementations, the executable instructions further include executable instructions to manipulate at least one of the processor or the RF modem to monitor at least one cellular signal quality parameter of the first cellular connection and determine at least one equivalent WLAN signal quality parameter for a virtual WLAN access point representing the first cellular connection based on the at least one cellular signal quality parameter. The executable instructions further can include executable instructions to manipulate at least one of the processor or the RF modem to monitor a WLAN modem of the user equipment to identify one or more second WLAN access points available to connect to the user equipment, determine at least one WLAN signal quality parameter of each of the identified one or more second WLAN access points, select one of the one or more second WLAN access points or the virtual WLAN access point for establishing a WLAN connection for the user equipment based on the WLAN signal quality parameters of the one or more second WLAN access points and the at least one equivalent WLAN signal quality parameter for the virtual WLAN access point, wherein the first cellular connection is virtualized as the WLAN connection responsive to selection of the virtual WLAN access point for establishing the WLAN connection. The user equipment therefore can include a display screen configured to display a graphical representation of the at least one equivalent WLAN signal quality parameter.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

While wireless communication devices can support multiple separate subscriber connections, these subscriber connections typically are isolated such that the local services associated with one subscription typically cannot readily access and utilize a data path established by another subscription. To illustrate, many mobile network operators support voice-over-Internet Protocol (VoIP) services whereby a telephone call can be conducted at least in part via a data connection between a wireless communication device and a mobile network operator. However, when a conventional wireless communication device is unable to establish a sufficient data connection using a first SIM (or the user is unwilling to use the data connection established using the first SIM for various reasons) but the wireless communication device has a sufficient data connection with another carrier using a second SIM, the conventional wireless communication device typically is unable to use the data connection associated with the second SIM to establish or support a VoIP call based on the subscriber identification associated with the first SIM. Messaging, presence, and other IP Multimedia Subsystem (IMS) services likewise are unable to utilize the data connection provided by a separate subscription in conventional wireless communication devices.

The present disclosure describes embodiments of systems and methods for facilitating use of a cellular connection established using a first subscriber identity at a UE in support of voice or data services associated with a separate second subscriber identity at the UE through the virtualization of the cellular connection such that the cellular connection is presented to local processes executing at the UE for the second subscriber identifier as a wireless local area network (WLAN) access point. Accordingly, these local processes can utilize this virtual WLAN access point as they would with a connection with any actual WLAN access point, including communicating data in association with various services associated with the second subscriber identity, such as Voice-over-WiFi (VoWiFi) or other VoIP services, messaging services, presence services, and the like.

Figure 1:
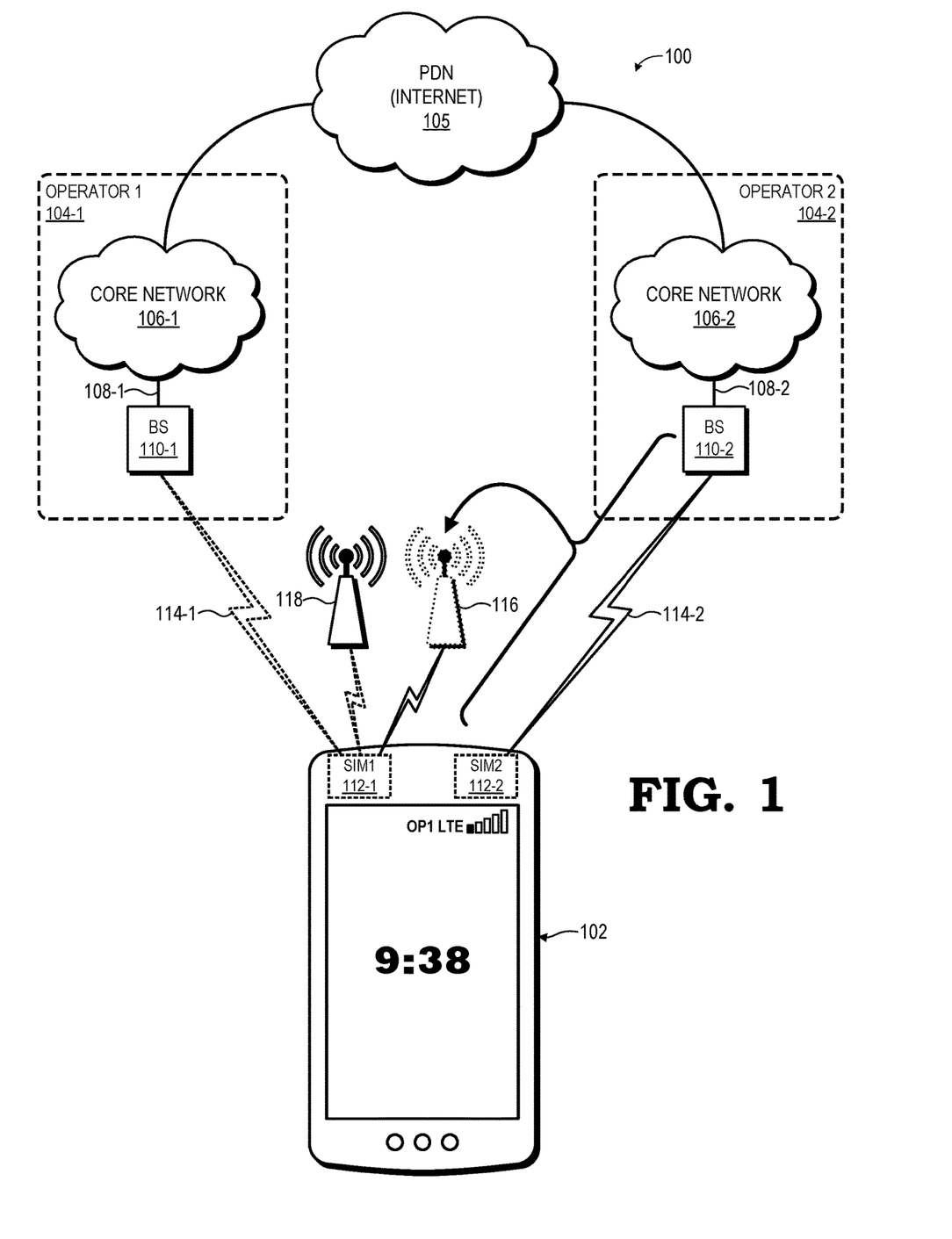
FIG. 1 is a block diagram illustrating a mobile cellular system employing a user equipment (UE) with cellular-to-WLAN virtualization in accordance with some embodiments.
Figure 2:
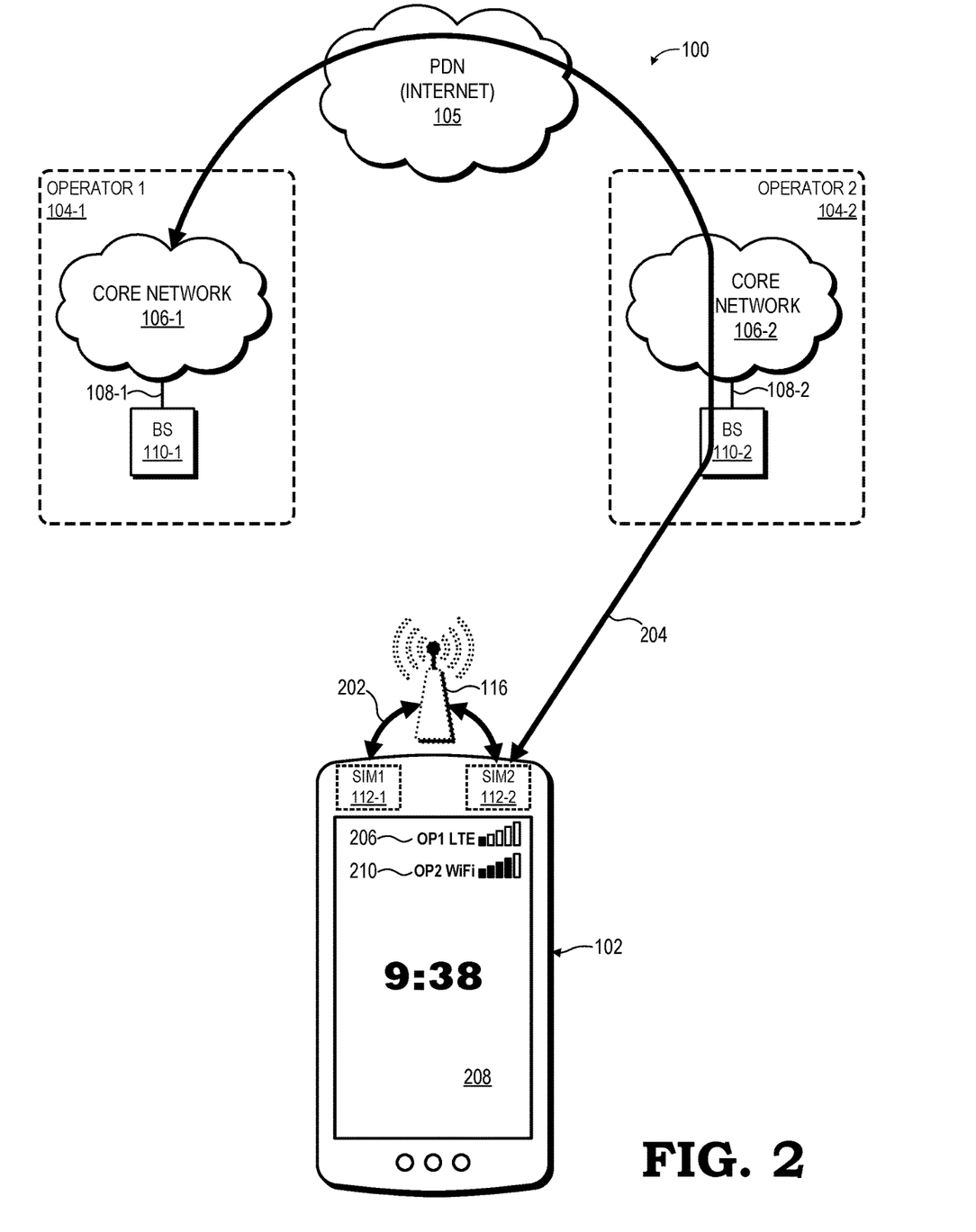
FIG. 2 is a block diagram illustrating a virtualized data path in the mobile cellular system of FIG. 1.

FIGS. 1 and 2 illustrate a mobile cellular system 100 utilizing virtualization of a cellular connection as a WLAN access point in accordance with some embodiments. As shown in FIG. 1, the mobile cellular system 100 includes a user equipment (UE) 102 and one or more mobile network operators 104 (referred to herein as "operators" for brevity), which are also commonly referred to as "mobile carriers", "carrier networks", or simply "carriers." The UE 102 can include any of a variety of electronic wireless communication devices, such as a cellular phone, a cellular-enabled tablet computer or cellular-enabled notebook computer, an automobile or other vehicle employing cellular services (e.g., for navigation, provision of entertainment services, in-vehicle mobile hotspots, etc.), and the like. Each operator 104 is connected to one or more other operators 104 via at least one packet data network (PDN) 105, such as the Internet, via one or more private interconnecting data networks, or a combination thereof.

Each operator 104 includes a core network 106 and a plurality of edge networks, or radio access networks (RANs), connected via a backhaul infrastructure 108, such as core networks 106-1 and 106-2 and backhaul infrastructures 108-1 and 108-2 for operators 104-1 and 104-2, respectively. Each edge network includes a base station 110, such as base stations 110-1 and 110-2, operable to wirelessly communicate with UEs within signal range based on one or more radio access technologies (RATs). Examples of the base station 110 include, for example, a NodeB (or base transceiver station (BTS)) for a Universal Mobile Telecommunications System (UMTS) RAT implementation (also known as "3G"), an enhanced NodeB (eNodeB) for a Third Generation Partnership Project (3GPP) Long Term Evolution (LTE) RAT implementation, a 5G node B ("gNB") for a 3GPP Fifth Generation (5G) New Radio (NR) RAT implementation, and the like. As is well known in the art, the base stations 110 operate as an "air interface" so as to establish radio frequency (RF) wireless connections with UEs, and these wireless connections (or "links") then serve as data and voice paths between the UEs and the core networks 106 for providing various services to the UEs, including voice services via circuit-switched networks or packet-switched networks, messaging services such as simple messaging service (SMS) or multimedia messaging service (MMS), multimedia content delivery, presence services, and the like.

Generally, the provision of services by an operator 104 to a UE is subscription-based; that is, the particular services provided, and the manner in which they are provided, by the operator 104 is based on a mobile subscription established by the operator 104 for the corresponding UE. Each mobile subscription typically is associated with a corresponding unique subscriber identity, with the international mobile subscriber identity (IMSI) format as a frequently-used format for subscriber identities. In many instances, the subscriber identity is encoded in an integrated circuit (IC) card for security purposes and to allow the user to switch UEs while maintaining the same subscriber identity by removing the IC card from one UE and installing it in another UE. Examples of an IC card include a Universal Integrated Circuit Card (UICC), and more specifically, a subscriber identity module (SIM). In other instances, the IC card is "virtualized" by instead storing the subscriber identity information and related information in a secure memory location in the UE itself. For ease of reference, example implementations of the subscriber identity being stored on, and represented by, a SIM are described. However, the techniques described herein are not limited to these examples, and thus references to a SIM for purposes of subscriber identity equally apply to other forms of subscriber identity representation unless explicitly noted.

As the services provided by an operator are subscriber-specific, in at least one embodiment the UE 102 employs two or more subscriber identities to facilitate access to two or more operators. In the illustrated embodiment, this multiple subscriber identity configuration for the UE 102 is implemented via two SIMs 112: SIM 112-1 ("SIM1") representing a subscriber identity associated with a subscription with operator 104-1 and SIM 112-2 ("SIM2") representing a subscriber identity associated with a subscription with operator 104-2. SIMs 112-1 and 112-2 can be implemented as, for example, physical SIMs, virtual SIMs, or a combination thereof.

Each SIM 112 can be used by the UE 102 to establish a cellular connection with the corresponding operator 104 based on a corresponding radio access technology (RAT). Examples of cellular RATs include, but are not limited to, the aforementioned 5G NR, LTE, Global System for Mobility (GSM), and UMTS, as well as Single Carrier Radio Transmission Technology (1×RTT), Worldwide Interoperability for Microwave Access (Wi-MAX), Code Division Multiple Access (CDMA), Time Division Multiple Access (TDMA), Evolution-Data Optimized (EV-DO), and the like. In some embodiments, the UE 102 employs a singleSIM mode in which only a single SIM can be in use at the UE 102 and a user manually switches between SIMs 112 to switch between cellular connections. In other embodiments the UE 102 employs a standby mode, such as Dual SIM Dual Standby (DSDS), in which a single RF resource (e.g., RF transceiver and modem) is shared by both SIMs 112 and in which the UE 102 alternates between the cellular connection of SIM 112-1 and the cellular connection of SIM 112-2 via time multiplexing. In still other embodiments, the UE 102 employs a dual active mode, such as Dual SIM Dual Active (DSDA), in which each SIM 112 has its own separate RF resource of the UE 102, thereby allowing both cellular connections to be active concurrently.

While facilitating use of multiple subscriber identities can permit the UE 102 to connect to two or more operators, in some scenarios use of one of the cellular connections may be impracticable or impossible. For example, the UE 102 could roam beyond the air interface range of the base stations 110 of an operator 104, thereby preventing the UE 102 from establishing any kind of cellular connection with that operator 104, or the signal quality or connection quality of one cellular connection may limit its usability by the UE 102. As another example, the UE 102 could be located outside of the region associated with its primary, or "home", operator and thus "roaming" in the coverage range of a secondary operator, and the roaming charges that would be incurred if the UE 102 uses the cellular connection with the secondary operator in support of, for example, voice services could be prohibitive for the user. In such instances, it could prove advantageous if a satisfactory cellular connection established for one subscription could be used to support services provided by the operator associated with the other subscription. In conventional UEs, the tight coupling between subscriber, the software stack at the UE associated with the subscriber, and the operator's support of services based on the subscriber identity prevent such cross-over sharing of a cellular connection.

However, in at least one embodiment the UE 102 of the mobile cellular system 100 facilitates use of a cellular connection with one operator on the basis of one subscription for providing services to the UE 102 for processes executed at the UE 102 in association with another subscription through the virtualization of the cellular connection as a wireless local area network (WLAN) access point (AP). Examples of WLAN include, for example, "WiFi" (e.g., in accordance with an International Electrical and Electronics Engineer (IEEE) 802.11 standard, such as IEEE 802.11a/b/g/n/ac), wireless personal area network (WPAN) protocols, such as Bluetooth™ (e.g., Bluetooth 1.0, 1.2, 2.0, 2.1, 3.0, 4.0, 5.0, etc.), Near Field Communication (NFC), Ultra-Wide Band (UWB), and the like. Alternatively, in some embodiments in which the cellular access network is a 5G NR-compliant access network, WLAN can refer to what is commonly identified as untrusted non-3GPP access network in the 5G NR specification, whereas in such embodiments the term "cellular" refers to what is commonly identified as a trusted 3GPP access network in the 5G NR specification. With a suitable cellular connection with one subscription available, the UE 102 then establishes a WLAN interface to this virtualized WLAN and presents the WLAN interface to the processes associated with the other subscription for use as though it were a WLAN interface for an actual WLAN AP to which the UE 102 is connected.

To illustrate, FIG. 1 depicts an example in which a cellular connection 114-1 between the UE 102 and the operator 104-1 using SIM 112-1 is "compromised" while a cellular connection 114-1 between the UE and the operator 104-2 using SIM 112-2 is "satisfactory" for data connection purposes. In this context, the cellular connection 114 is compromised in that either it does not actually exist (that is, there is no cellular connection), is of unsatisfactory data bandwidth or signal integrity, or a user's use of the cellular connection 114-1 would result in elevated or excessive usage charges or power consumption, and the like. Conversely, a satisfactory cellular connection in this context is a cellular connection with a signal strength, bandwidth, and usage billing scheme that is considered satisfactory to the user. Accordingly, in at least one embodiment, the UE 102 establishes a mobile hot spot (MHS) for the satisfactory cellular connection 114-2, virtualizes the MHS as a virtual WLAN access point (AP) 116, and presents a WLAN interface for the virtual WLAN AP 116 as a candidate WLAN interface for use by the processes associated with SIM 112-1. There may also be one or more actual WLAN AP 118 present and available for connection to the UE 102. The UE 102 then selects a WLAN AP from the one or more candidate WLAN APs, including the virtual WLAN AP 116, based on any of a variety of criteria, establishes a wireless connection with the selected WLAN AP, and then can use the expanded network connection provided by the selected WLAN AP to establish a data path to one or more target networks, such as the PDN 105 or to the core network 106-1 of the operator 104-1, for use by the local processes at the UE 102 that are associated with SIM 112-1.

In the event that the selected WLAN AP is an actual WLAN AP 118, then the establishment and use of the wireless connection with the actual WLAN AP 118 can be performed in accordance with any of a variety of well-known or proprietary techniques. However, in the event that the selected WLAN AP is the virtual WLAN AP 116, the UE 102 operates to present the virtual WLAN AP 116 as a typical WLAN AP. That is, in at least one embodiment, the fact that the virtual WLAN AP 116 is actually a cellular connection is obfuscated from the local processes at the UE 102 that are associated with the SIM 112-1. As such, the "wireless connection" established between the UE 102 and the virtual WLAN AP 116 is in actuality a data path in the UE 102 between the local processes associated with SIM 112-1, the software stack associated with SIM 112-2, and the base station 110-2 of the operator 104-2.

FIG. 2 illustrates an example of this virtualization of a cellular connection as a WLAN AP in the mobile cellular system 100 in accordance with some embodiments. In this depicted example, the UE 102 selects the virtual WLAN AP 116 obfuscating the cellular connection 114-2 (FIG. 1) and, from the perspective of the software stack associated with SIM 112-1, establishes a (virtual) WLAN connection 202 with the virtual WLAN AP 116. The software stack for SIM 112-1 then works to establish a data path 204 between the UE 102 and the core network 106-1, spanning the base station 110-2, backhaul infrastructure 108-2, and core network 106-2 of the operator 104-2, the PDN 105, and the core network 106-1 of the operator 104-1. The core network 106-1 of the operator 104-1 and the local processes associated with SIM 112-1 then can use this data path 204 to provide various services in accordance with the subscription offered by the operator 104-1 in association with the subscriber identity represented by SIM 112-1.

As an example, the software stack for SIM 112-1 can establish a secure tunnel between the UE 102 and the core network 106 via the data path 204, such as by using an evolved Packet Data Gateway (ePDG) protocol or Trusted Wi-Fi Access Gateway (TWAG) to establish an IP Security (IPSec) tunnel between the UE 102 and an ePDG-enabled packet data network gateway (P-GW)(not shown) on the edge of the core network 106-1. With this secure tunnel in place, the operator 104-1 can provide subscriber-based services to the UE 102 via the secure tunnel. To illustrate, VoWiFi and other VoIP services emulate circuit-based telephony by enabling a UE to establish and conduct a telephone call via a packet-switched network. In such instances, the operator 104-1 can provide such VoIP services to the software stack associated with the SIM 112-1 via the cellular connection 114-2 with the operator 104-2 and in a manner in which any telephone call is connected and conducted in association with the telephone number or other uniform resource identifier (URI) associated with SIM 112-1, even though the data path used for the telephone call is conducted over a cellular connection with a different operator; that is, operator 104-2. Such services also can include other IP Multimedia Subsystem (IMS) services, such as SMS, MMS, or other messaging services provided in association with the subscriber identity represented by SIM 112-1, Video-over-IP in association with the subscription for the subscriber identity represented by SIM 112-1, and the like.

Figure 3:
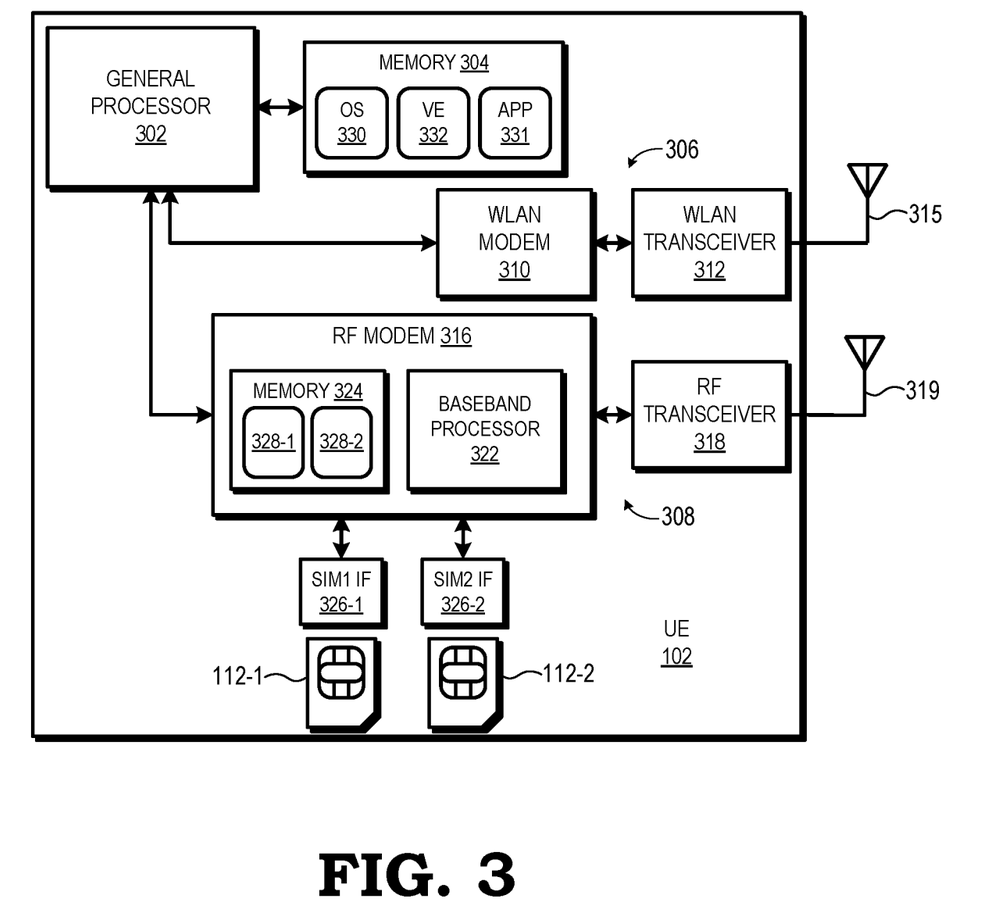
FIG. 3 is a block diagram illustrating a hardware configuration of the UE of FIGS. 1 and 2 in accordance with some embodiments.

FIG. 3 illustrates an example hardware configuration for the UE 102 in support of cellular-to-WLAN connection virtualization in accordance with some embodiments. In the depicted example, the UE 102 includes a central processing unit (CPU) or other general processor 302, a system memory 304, a WLAN resource 306, and an RF resource 308. The WLAN resource 306 includes a WLAN modem 310, a WLAN transceiver 312, and at least one WLAN antenna 315 suitable for RF signaling and signal processing in one or more frequency bands typically associated with WLAN RATs. Similarly, the RF resource 308 includes an RF modem 316, an RF transceiver 318, and at least one RF antenna 319 suitable for RF signaling and signal processing in frequency bands associated with cellular RATs. The RF modem 316 includes a baseband processor 322 and a memory 324, which can include, for example, a Flash memory, non-volatile random access memory (NVRAM) or other non-volatile memory, or static DRAM (SRAM) or dynamic RAM (DRAM) or other volatile memory, or a combination thereof. The WLAN modem 310 can be configured in a manner similar to the RF modem 316 with a WLAN protocol stack executed by a processor or other processing element. The RF modem 316 is coupled to two or more SIM interfaces (IFs) 326, such as SIM1 IF 326-1 and SIM2 IF 326-1 for receiving and connecting to SIMs 112-1 and 112-2, respectively. As one or both of the SIMs 112-1 or 112-2 can be implemented as a virtual SIM ("eSIM"), the corresponding SIM interface 326 can represent, for example, the secure memory location in the UE 102 that stores the subscriber identity and associated information represented by the virtual SIM. Note that in the depicted embodiment, the UE 102 is configured to support either a singleSIM mode or a DSDM mode in which the RF resource 308 is shared between the SIMs 112-1 and 112-2 via time multiplexing when each SIM 112 has an ongoing cellular connection. In other embodiments, the UE 102 can be configured to support a dual SIM dual active (DSDA) mode with a separate instance of the RF resource 308 for each SIM 112 so that cellular connections for both SIMs 112-1 and 112-2 can be active concurrently. Further, it will be appreciated that the UE 102 can include a number of additional components omitted from FIG. 3 for ease of illustration, including, for example, one or more displays, one or more touchscreens, keypads, mice, touchpads, microphones, speakers, and other user input/output devices, one or more sensors, batteries or other power sources, graphical processing units (GPUs) or other coprocessors, and the like.

As a general operational overview, the general processor 302 executes executable instructions from a software stack that includes an operating system (OS) 330 (also commonly referred to as a "kernel") and one or more user software applications 331, and which further can include the protocol stacks executed by processors of the RF modem 316 and WLAN modem 310. The OS 330, through manipulation of the processor 302, manages the general operation of the various hardware components of the UE 102 as well as to support the execution of the one or more user software applications 331, with the executable instructions representing the OS 330 and the user software application 331 typically accessed from system memory 304 for execution by the general processor 302. During execution, one or more processes of the OS 330 or the user software application 331 may seek to wirelessly communicate with a component in the mobile cellular system 100 (FIG. 1), such as with a server, a gateway, another UE, and the like, with these processes referred to herein as "local processes."

In the event that a local process is seeking to use a cellular connection, the OS 330 coordinates with the RF modem 316 to establish a cellular connection with a corresponding operator 104 based on the subscription with that operator provided via the corresponding SIM 112. To this end, the memory 324 of the RF modem 316 stores a protocol stack 328 for each subscriber identity (e.g., protocol stacks 328-1 and 328-2 for SIMs 112-1 and 112-2, respectively), with each protocol stack 328 storing executable instructions that, when executed by the baseband processor 322, manipulate the baseband processor 322 to perform various operations in accordance with a radio access technology (RAT) protocol or other communication protocol associated with the air interface provided by the base station 110 (FIG. 1) of the operator 104 to which the RF resource 308 is attempting to establish a communication link. As is well known, such operations typically are associated with the lower-level layers of a network protocol, such as some or all of the physical, data link, and network layers, while the OS 330 and the user software application 331 support the higher-level layers of the network protocol, such as the transport, session, presentation, and application layers. Similarly, in the event that the local process seeks to use a WLAN connection, the OS 330 coordinates with the WLAN modem 310 to identify any available WLAN APs, and assuming at least one suitable WLAN AP is available, establish a WLAN connection with a suitable WLAN AP using a WLAN protocol stack associated with the appropriate RAT and a corresponding higher-level protocol stack provided by the OS 330.

In some situations, a local process that utilizes a service provided by the associated operator 104 may seek to support the service using a WLAN connection rather than a cellular connection with the associated operator. One such example is VoWiFi (also commonly referred to as WiFi Calling (WFC)) in which a telephony call session is established between a voice telephony local process at the UE and the operator 104 using a data path (e.g., data path 204, FIG. 2) that extends over a WLAN connection between the UE 102 and a corresponding WLAN AP. In such instances, the OS 330 operates to present a WLAN interface (e.g., a wlan0( ) interface in a Linux-based OS) to the local process and other software components of the software stack associated with the subscription. The WLAN interface typically includes one or more application programming interfaces (API) for use by the various software processes of the UE 102 for managing the transfer of data, control, and other signaling between the local process and the WLAN modem 310 and the corresponding WLAN connection.

WLAN connections and cellular connections both provide opportunities to establish data paths in support of various services. However, in a conventional UE, the local process of one subscription typically is unable to access the cellular connection established for a different subscription. In contrast, the UE 102, in at least one embodiment, facilitates the use of the cellular connection for one subscription in support of services for a different subscription through virtualization of the cellular connection of one subscription as a WLAN AP that can then be treated as a WLAN interface for another subscription. Accordingly, in at least one embodiment, the software stack of the UE 102 implements a virtualization engine (VE) 332 to manage the establishment, presentation, and use of a virtual WLAN AP and its corresponding WLAN interface for a cellular connection for services that are not associated with the subscription used to establish the cellular connection.

Figure 4:
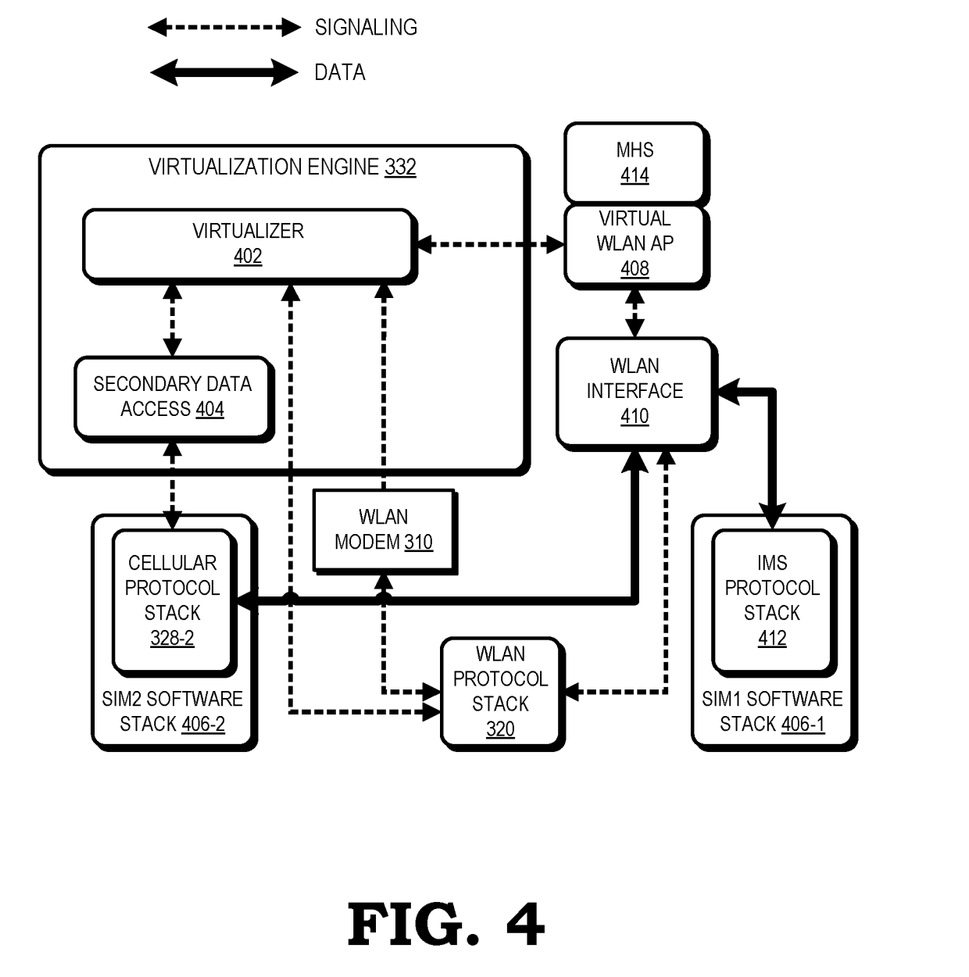
FIG. 4 is a block diagram illustrating a virtualization engine of the UE of FIGS. 1-3 in accordance with some embodiments.

FIG. 4 illustrates the virtualization engine 332 and its interaction with other components of the UE 102 in greater detail in accordance with some embodiments. The virtualization engine 332 includes one or more APIs and corresponding executable instructions that, when executed alone or in combination with corresponding executable instructions of one or more of the OS 330, the user software application 331, or the protocol stacks 328-1, 328-2, manipulate one or more of the general processor 302, the RF modem 316, or the WLAN modem 310 to perform the functionality described herein. The virtualization engine 332 is organized into two primary modules: a virtualizer module 402 and a secondary data access module 404. The secondary data access module 404 interfaces with the software stacks 406 of each of the SIMs 112 (e.g., software stack 406-1 and software stack 406-2 for SIM 112-1 and 112-2, respectively) and, more particularly, interfaces with the protocol stacks 328 of these software stacks 406 to monitor the telephony states and other status indicia of cellular connections for one or both of the subscriptions represented by SIMs 112-1 and 112-2. The secondary data access module 404 reports status updates to the virtualizer module 402, such as reporting when a cellular connection becomes available for a subscription or when a cellular connection is no longer available. The secondary data access module 404 further operates to obtain various parameters regarding an available cellular connection, including signal strength parameters, link capacity estimation parameters, and the like, and provides this information to the virtualizer module 402.

The virtualizer module 402 interfaces with the secondary data access module 404, the WLAN modem 310, and a WLAN protocol stack 320 implemented in the OS 330, the WLAN modem 310, or a combination thereof. The WLAN protocol stack 320 represents the set of software processes that establish and manage a wireless connection with a selected WLAN AP via the WLAN modem 310 in accordance with a corresponding WLAN RAT, such as a WiFi/IEEE 802.11 RAT, a Bluetooth RAT, a UWB RAT, and the like. As a general overview, the virtualizer module 402 operates to monitor input from the secondary data access module 404 to identify whether any cellular connections are available for virtualization as a virtual WLAN AP 408 (one embodiment of virtual WLAN AP 116, FIG. 1), and if so, to convert the signal quality parameters of the cellular connection to more closely align with signal quality parameters used for WLAN connections. Further, the virtualizer module 402 monitors input from the WLAN modem 310 to determine whether any actual WLAN APs are available, and if so, to determine their respective signal quality parameters.

In the event that a local process of an operator 104, such as, for example, an IMS protocol stack 412 of the software stack 406-1, indicates an intent to use a WLAN connection (for example, a cellular connection with that operator 104 is unavailable or otherwise compromised) or in response to another trigger signaling a need for a WLAN connection, the virtualizer module 402 evaluates the available candidate WLAN APs, including both any available actual WLAN APs and any available virtual WLAN APs (e.g., virtual WLAN AP 408), and selects a candidate WLAN AP for use in establishing a WLAN connection. This selection can be based on any of a number of criteria, including indicated signal quality parameters of the candidate WLAN APs (which, for a virtual WLAN AP 408, is mimicked as one or more "equivalent" WLAN signal quality parameters based on a mapping of corresponding cellular signal quality indicia), a link capacity estimations, and the like.

If an actual WLAN AP is selected, then the WLAN modem 310 establishes a WLAN connection with the selected WLAN AP, a WLAN interface for the WLAN connection is instantiated, and the WLAN interface is presented to the software stack 406 associated with the operator 104 for its use using any of a variety of well-known or proprietary WLAN-to-cellular support processes. In the event that the virtual WLAN AP 408 is selected, the virtualizer module 402 operates to establish, in coordination with the WLAN protocol stack 320, a WLAN interface 410 for the virtual WLAN AP 408 (that is, for the cellular connection virtualized as the virtual WLAN AP 408) and presents the WLAN interface 410 for use by the software stack 406 in the same manner that a WLAN interface for an actual WLAN AP would be used—that is, so that, from the perspective of the software stack 406, the virtual WLAN AP 408 appears to be like any other WLAN AP. This process includes, for example, the virtualizer module 402 and the WLAN protocol stack 320 establishing an instance of a mobile hotspot (MHS) 414 for the cellular connection, instantiating the WLAN interface 410 for the MHS instance, and configuring the WLAN protocol stack 320 and the WLAN interface 410 accordingly, such as by assigning an IP address to the WLAN interface 410, configuring the WLAN interface 410 as a metered WLAN interface so that other processes are prevented from consuming data and bandwidth on the cellular connection, and the like. To this end, in addition to conventional interfaces and functions found in conventional WLAN protocol stacks, the WLAN protocol stack 320 further includes, in some embodiments, one or more APIs or other interfaces available to the virtualizer module 402 to allow the virtualizer module 402 to monitor the actual WLAN APs, to trigger the connection and disconnection of the virtual WLAN AP 408, and to update the signal strength and other signal quality indicia for the WLAN interface 410 based on input from the secondary data access module 404 regarding the current signal quality of the represented cellular connection.

Figure 5:
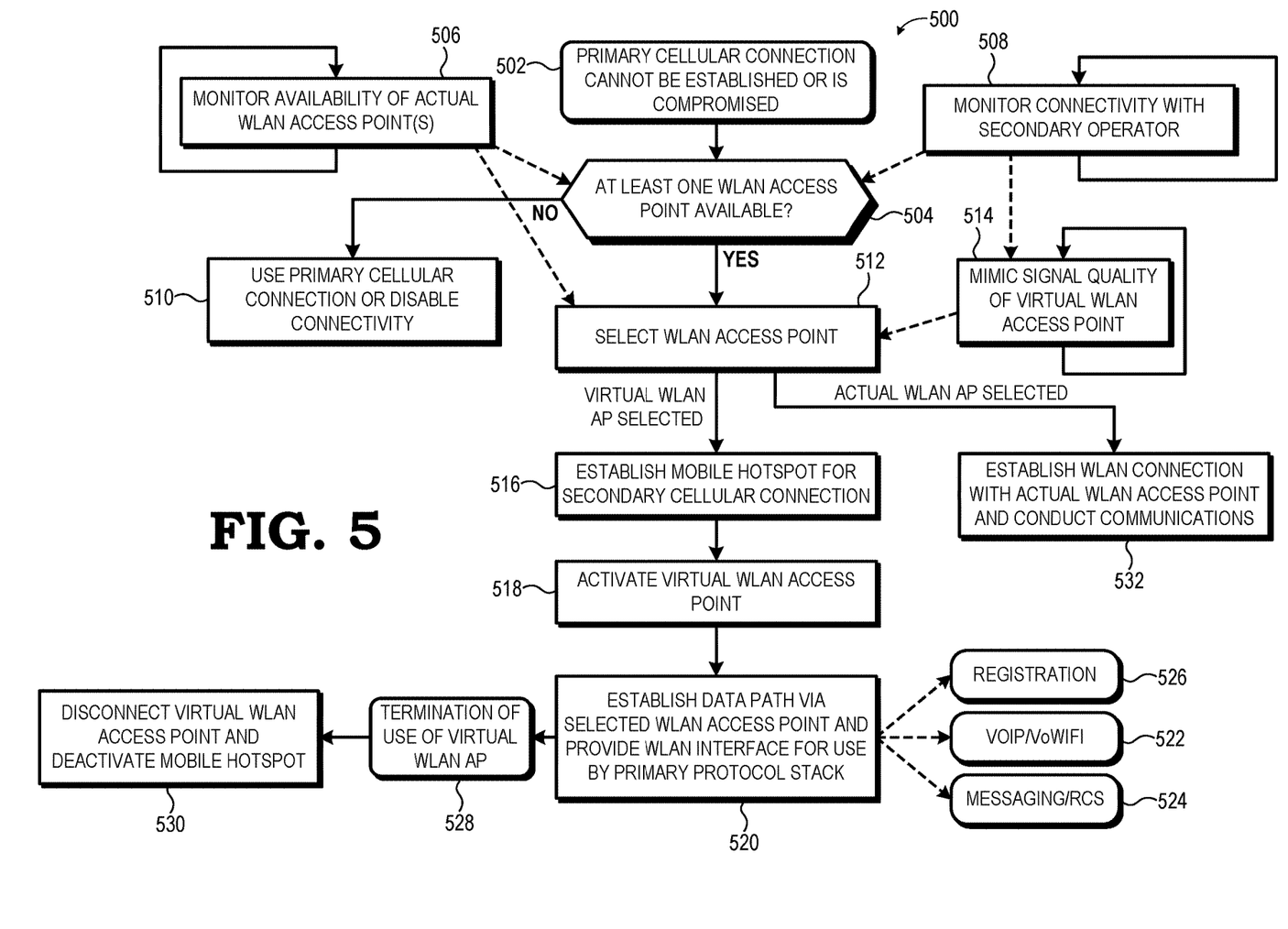
FIG. 5 is a flow diagram illustrating a method for cellular-to-WLAN virtualization in a UE in accordance with some embodiments.

FIG. 5 illustrates an example method 500 of operation of the UE 102 for establishing and using a cellular connection virtualized as a WLAN connection for a different subscriber in accordance with some embodiments. The method 500 is described with reference to the embodiments of the UE 102 depicted in FIGS. 1-4, but is not limited to such configurations and instead can be adapted to any of a variety of configurations of a multiple-subscriber UE using the guidelines provided herein.

For illustrative purposes, method 500 is described in an example scenario in which use of a cellular connection 114-1 (FIG. 1) with operator 104-1 using the subscription associated with SIM 112-1 for supporting services provided by that same operator is impracticable, such as because a sufficient cellular connection cannot be established, the expense of using the cellular connection is unacceptable to the user, the use of the cellular connection would consume excessive power, and the like. Accordingly, in this example scenario, the cellular connection with operator 104-2 using the subscription associated with SIM 112-2 is contemplated as a candidate for virtualization as a WLAN AP that can be used to support services provided in association with the IMS protocol stack 412 of the software stack 406-1 for the subscription associated with SIM 112-1 at the UE 102. Thus, in this example scenario, the cellular connection 114-1 (FIG. 1) with the operator 104-1 is referred to as the "primary cellular connection" as it is directly associated with the subscription associated with the services seeking a data path for use, and the cellular connection 114-2 (FIG. 1) with the operator 104-2 is referred to as the "secondary cellular connection" as it is not directly associated with this subscription.

Accordingly, method 500 is initiated at block 502 in response to a determination that the primary cellular connection cannot be satisfactorily established or a determination than an established primary cellular connection between the UE 102 and the operator 104-1 is too expensive for the user to use, will consume too much power, or otherwise is compromised in some way. In response, at block 504, the virtualizer module 402 of the virtualization engine 332 determines whether there is at least one WLAN access point available to provide a secondary data path between the UE 102 and the operator 104-2. In support of this determination process, at block 506 the WLAN modem 310 monitors for actual WLAN APs (e.g., actual WLAN AP 118, FIG. 1) available to the UE 102 via, for example, detection of beacon frames transmitted by nearby WLAN APs, determines corresponding current signal quality parameters and other capabilities of the identified WLAN APs, and reports this information to the virtualizer module 402. Similarly, at block 508, the secondary data access module 404 periodically, continuously, or otherwise repeatedly monitors the connectivity between the UE 102 and the edge network of the operator 104-2 and reports the current connectivity status to the virtualizer module 402. To illustrate, in one embodiment, the secondary data access module 404 uses an API or other interface with the cellular network protocol stack 328-2 for SIM 112-2 to obtain current signal parameters for the secondary cellular connection, including, for example, a received signal strength indicator (RSSI) value, a reference signal received quality (RSRQ) value, a link capacity estimation (LCE) value, and the like.

Returning to block 504, if the virtualizer module 402 determines that a suitable WLAN AP is unavailable (that is, there are no suitable actual WLAN APs available and the secondary cellular connection either is not available or is unsatisfactory for use as a data path in this context), then at block 510 the virtualizer module 402 signals to the IMS protocol stack 412 that a secondary data path is not accessible for processes supported by the IMS protocol stack 412, and in response the IMS protocol stack 412 either renews efforts to use the primary cellular connection in support of these services or signals to the local services that a data path is unavailable for their use.

However, if at least one candidate WLAN AP is available, then at block 512 the virtualizer module 402 selects a candidate WLAN AP for use in establishing a secondary data path. If there is more than one candidate WLAN AP, the selection process can be based on, for example, signal quality, bandwidth or throughput considerations, jitter and delay considerations, and the like, depending on the needs of the local service to be supported by the secondary data path. Thus, in at least one embodiment, in order to provide a more equivalent evaluation in the event that the secondary cellular connection is available to be represented as a virtual WLAN AP, as represented by block 514 the virtualizer module 402 utilizes the current signal quality information for the secondary cellular connection as provided by the secondary data access module 404 (block 508) to determine one or more equivalent WLAN signal quality parameters so as to mimic a WLAN signal quality indicator for the virtual WLAN AP 408 based on the cellular signal quality of the secondary cellular connection. As described above, the secondary data access module 404 can obtain one or more of the current RSSI, RSRQ, or LCE values for the secondary cellular connection, and, from these one or more values, derive one or more corresponding WLAN signal quality indicators for the virtual WLAN AP 408. As one example, WiFi protocols typically utilize the RSSI (in terms of decibel-milliwatts or dBm) of a WiFi RF connection with a possible range of −100 dBm to −50 dBm to qualify the WiFi RF connection as one of a plurality of levels, which typically is composed of "unusable", "low quality", "medium quality", or "high quality", with the boundaries between these different quality levels within the possible range being implementation-specific. In this example, the virtualizer module 402 thus can determine a WLAN-equivalent RSSI for the secondary cellular connection based on a transform of the cellular RSSI as modified based on one or both the RSRQ or LCE for the secondary cellular connection, and based on this WLAN-equivalent RSSI being used as the signal quality representation for the virtual WLAN AP 408 based on specified sub-ranges for different quality levels.

If the virtualizer module 402 selects the virtual WLAN AP 408 for use as the secondary data path, then the virtualizer module 402 initiates the virtualization of the secondary cellular connection as a WLAN AP by instantiating or otherwise establishing a mobile hotspot (MHS) at the UE 102 for the secondary cellular connection to block 516. This process can include, for example, assigning a media access control (MAC) address to the MHS, assigning a service set identifier (SSID) to the MHS, selecting any authentication or encryption processes to be utilized by the MHS, and configuring an AP profile for the MHS based on this information. The process further can include establishing a secure tunnel between the UE 102 and the base station 110-2 over the secondary cellular connection. When the MHS is established, at block 518 the virtualizer module 402 signals the WLAN protocol stack 320 to activate the virtual WLAN AP 408 for the secondary data connection.

In many implementations, the OS 330 or associated application is configured to graphically represent the signal quality of some or all of the wireless connections currently in place at the UE 102. To illustrate, referring briefly to FIG. 2, the OS 330 provides a graphical representation 206 for display at a display screen 208 of the UE 102, where the graphical representation 206 visually depicts the current signal quality of the primary cellular connection, including, for example, a name for the operator (e.g., "OP1"), the RAT type for the primary cellular connection (e.g., "LTE"), and a series of bars that graphically depict the current connection quality. Thus, when the virtual WLAN AP 408 is instantiated and selected for connection, the secondary cellular connection can likewise be represented at the display screen 208 as a graphical representation 210 that likewise depicts a name for the operator (e.g., "OP2"), the connection RAT type (virtualized as a "WiFi" connection although actually a cellular connection), and a series of bars that graphically depict the current connection quality as determined from the mimicked equivalent WLAN signal quality determined from the monitored signal parameters for the secondary cellular connection.

Following activation of the virtual WLAN AP 408 at block 518, at block 520 the WLAN protocol stack 320 presents the WLAN interface 410 for the established MHS to the IMS protocol stack 412 and the IMS protocol stack 412 commences use of the WLAN interface 410 for wirelessly communicating data to and from the UE 102 via the secondary cellular connection with the operator 104-2 on behalf of one or more local services associated with the subscription with the operator 104-1 associated with SIM 112-1. In at least one embodiment, the services facilitated by the IMS protocol stack 412 are services provided by the operator 104-1, and thus the protocol stack 328-1 for SIM 112-1 operates to utilize the secondary cellular connection to establish a secondary data path to the operator 104-2, such as by establishing the data path 204 (FIG. 2) that extends between the UE 102, the operator 104-2, the one or more PDNs 105, and the operator 104-1.

These services can include any of a variety of services supported by the operator 104-1 for the subscription represented by SIM 112-1. For example, these services can include any of a variety of IMS services, such as VoWiFi services or other VoIP services (block 522), SMS, MMS, or other messaging/paging services, chat, audio messaging, and other rich communication services (RCS), and presence services (block 524), and the like. Further, in some embodiments the secondary data path provided by the virtual WLAN AP 408 can be used for subscriber registration (block 526) for the subscription associated with the primary path. To illustrate, the 5G NR specification provides for a stand-alone procedure for use in mixed 4G/5G networks in which a UE registers with the operator using a 4G network so as to establish data communications that are conducted via an associated 5G network. In such instances and in similar registration scenarios, the protocol stack 328-1 for the SIM 112-1 can conduct a 5G Session Initiation Protocol (SIP) registration process via the data path utilizing the secondary cellular connection, including one or more of the random access process, setting up the Radio Resource Control (RRC) connection, performing the authentication and security processes, and performing the RRC reconfiguration process, as provided by the 5G registration procedure.

In response to an event terminating the use of the virtual WLAN AP 408 as represented by block 528, such as termination of a VoWiFi call, the UE 102 entering a standby mode, or an explicit termination signal from the software stack 406-1, at block 530 the virtualization module 402 signals the WLAN protocol stack 320 that the WLAN connection can be terminated, disables the WLAN interface 410, and tears down the MHS.

Returning to block 512, in the event that the virtual WLAN AP 408 is not selected and the virtualizer module 402 instead selects an actual wireless access point, then at block 532 the virtualizer module 402 directs the WLAN protocol stack 320 to establish a connection with the selected actual WLAN AP and the WLAN protocol stack 320 then provides a WLAN interface to the actual WLAN AP for the software stack 406-1 to use in accordance with any of a variety of well-known or proprietary processes.

Figure 6:
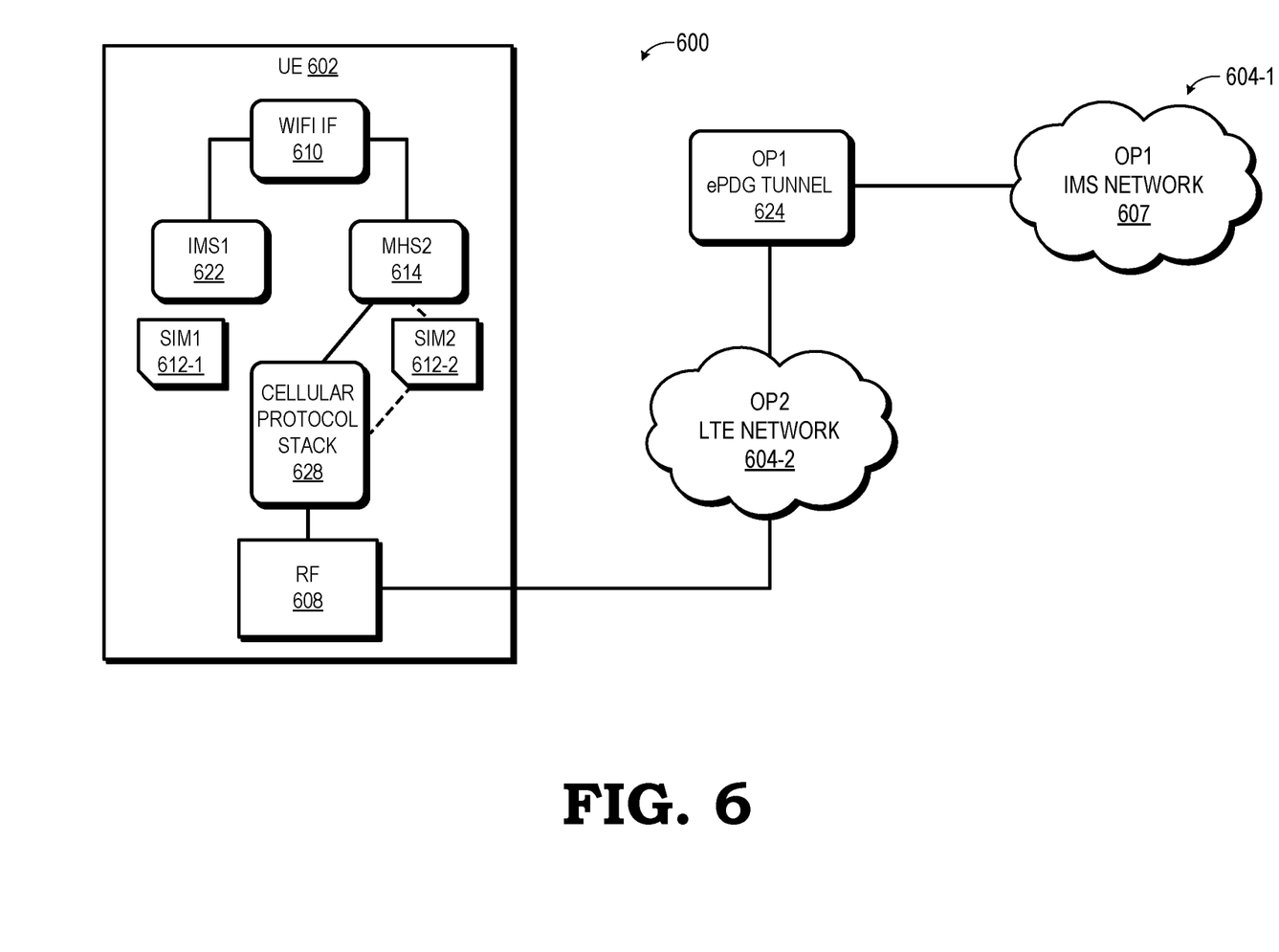
FIG. 6 is a diagram illustrating an example use case of the UE of FIGS. 1-4 in a roaming scenario in accordance with some embodiments.
Figure 7:
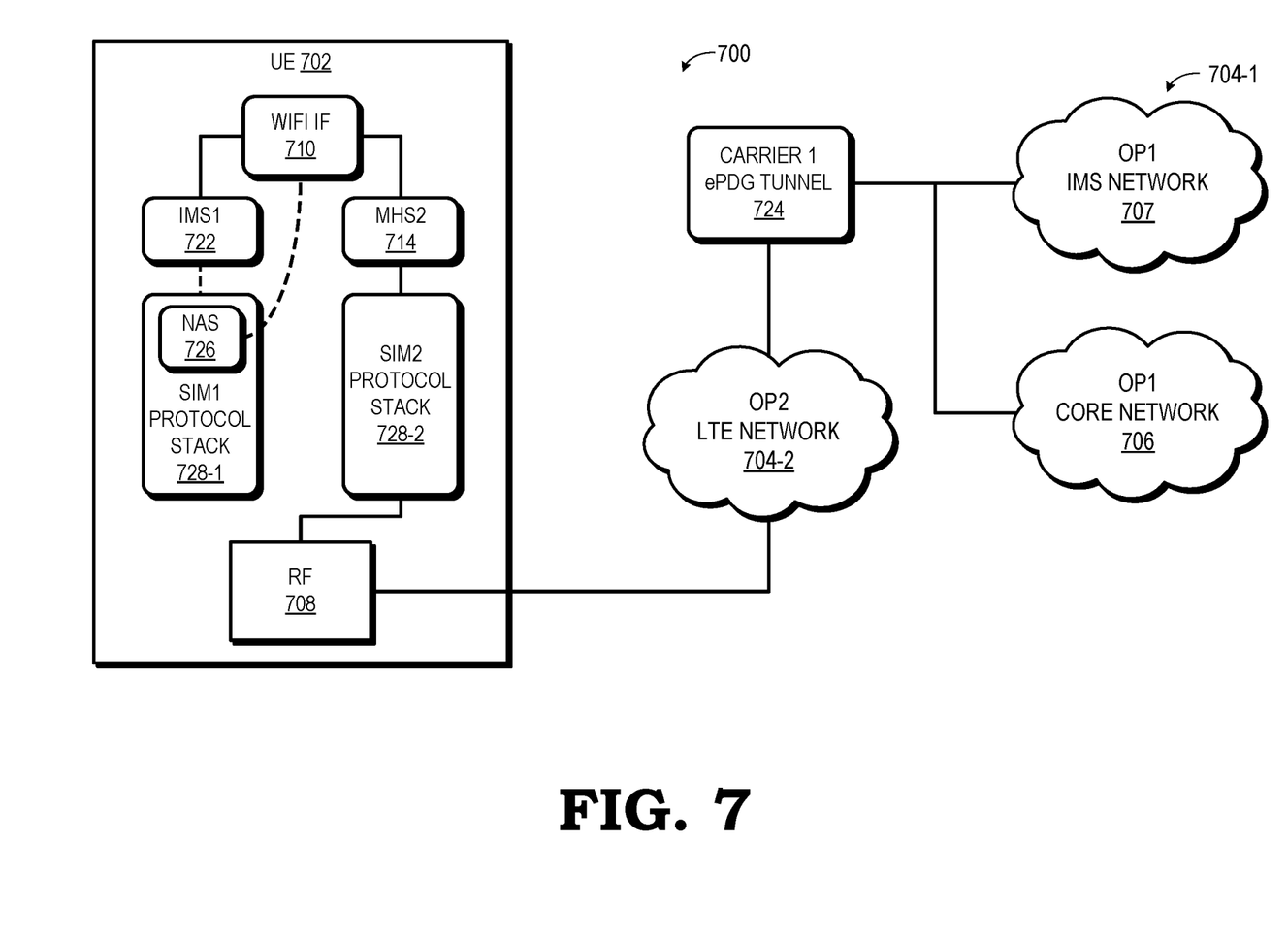
FIG. 7 is a diagram illustrating an example use case of the UE of FIGS. 1-4 in a registration scenario in accordance with some embodiments.

FIGS. 6 and 7 illustrate two example use cases for the mobile cellular system 100 described above. In the example use case of FIG. 6, a mobile cellular network 600 (one embodiment of mobile cellular system 100 of FIG. 1) includes a UE 602, an operator OP1 604-1 providing a subscription associated with a SIM1 612-1 via an LTE-based network, and an operator OP2 604-2 providing a subscription associated with a SIM2 612-2 via an LTE-based network. In this use case, the operator OP1 604-1 is the primary operator for the UE 602; that is, the user would prefer that network services be provided using the subscription with operator OP1 604-1, such telephone calls and SMS/MMS messages conducted in association with a telephone number or other subscriber identity for this subscription. However, in this usage case, a cellular connection between the UE 602 and the operator OP1 604-1 is impracticable, either because the UE 602 is not within transmission range of the operator OP1 604-1 or because any such cellular connection is of insufficient signal quality. Accordingly, a cellular protocol stack 628 for SIM2 612-2 establishes a cellular connection with the operator OP2 612-2 and the UE 602 further establishes an instance of a WiFi mobile hotspot MHS2 614, and virtualizes the WiFi MHS2 614 as a virtual WLAN AP and provides a WLAN interface for the virtual WLAN AP in the form of a WiFi interface 610 to a network protocol stack associated with SIM2 612-1 and executing at the UE 602. The network protocol stack then uses the WiFi interface 610 to establish an IPSec tunnel, such as the illustrated ePDG tunnel 624, between OP2 604-2 and an IMS server 607 of the OP1 604-1 in the resulting secondary data path. The UE 102 then makes the secondary data path available for use by an IMS process IMS1 622 executing at the UE 102 as part of the software stack associated with SIM2 612-2 so as to communicate data, control, and other signaling with the IMS server 607 in the OP1 604-1 via the ePDG tunnel 624.

In the example use case of FIG. 7, a mobile cellular network 700 (one embodiment of mobile cellular system 100 of FIG. 1) includes a UE 702, an operator OP1 704-1 providing a subscription associated with a SIM1 712-1 via a 5G NR-based network, and an operator OP2 704-2 providing a subscription associated with a SIM2 712-2 via an LTE-based network. As with the previous use case, the operator OP1 704-1 is the primary operator for the UE 702 but a cellular connection between the UE 702 and the operator OP1 704-1 is impracticable. Accordingly, a cellular protocol stack 728-2 for SIM2 712-2 establishes a cellular connection with the operator OP2 712-2 and the UE 702 further establishes an instance of a WiFi mobile hotspot MHS2 714, and virtualizes the WiFi MHS2 714 as a virtual WLAN AP and provides a WLAN interface for the virtual WLAN AP in the form of a WiFi interface 710 to a network protocol stack 728-1 associated with SIM2 712-1 and executing at the UE 602. A network access stratum (NAS) layer 726 of the network protocol stack 728 then uses the secondary data path facilitated by the WiFi interface 710 to perform a 5G registration process with a core network 706 of the OP1 704-1. After the registration is completed, the network protocol stack 728 uses the secondary data path to establish an IPSec tunnel, such as the illustrated ePDG tunnel 724, between OP2 604-2 and an IMS server 707 of the OP1 704-1 in the resulting secondary data path. The UE 702 then makes the secondary data path available for use by an IMS process IMS1 722 executing at the UE 702 as part of the software stack associated with SIM2 712-2 so as to communicate data, control, and other signaling with the IMS server 707 in the OP1 704-1 via the ePDG tunnel 724.

In some embodiments, certain aspects of the techniques described above are implemented by one or more processors of a processing system executing software. The software includes one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid state storage devices such as Flash memory, a cache, random access memory (RAM) or other non-volatile memory device or devices, and the like. The executable instructions stored on the non-transitory computer-readable storage medium can be in source code, assembly language code, object code, or other instruction format that is interpreted or otherwise executable by one or more processors.

A computer-readable storage medium includes any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A system comprising:
a user equipment comprising:
at least one processor;
at least one memory coupled to the at least one processor, the at least one memory storing executable instructions configured to manipulate the at least one processor to virtualize a cellular connection established with a mobile network operator based on a first subscriber identity as a virtual wireless local area network (WLAN) access point for use by one or more processes executing at the user equipment that are associated with a second subscriber identity;
wherein the user equipment is configured to virtualize the cellular connection by:
establishing a mobile hotspot for the cellular connection; and
providing a WLAN interface for the mobile hotspot for use as the virtual WLAN access point by the one or more processes.

2. The system of claim 1, wherein the user equipment is further configured to:
determine one or more cellular signal quality parameters for the cellular connection;
determine one or more equivalent WLAN signal quality parameters based on the one or more cellular signal quality parameters; and
represent the mobile hotspot as a virtual WLAN access point having the determined one or more equivalent WLAN signal quality parameters.

3. The system of claim 1, wherein the one or more processes include at least one of: a Voice-over-Internet Protocol (VoIP) process, a messaging process, and a Session Initiation Protocol (SIP) process.

4. The system of claim 1, further comprising:
the mobile network operator.

5. A method, comprising:
establishing a first cellular connection between a user equipment and a first mobile network operator based on a first subscription represented by a first subscriber identity of the user equipment; and
virtualizing the first cellular connection as a virtual wireless local area network (WLAN) connection for use by one or more processes executed at the user equipment for a second subscription represented by a second subscriber identity of the user equipment, wherein virtualizing the first cellular connection comprises:
establishing a mobile hotspot at the user equipment for the first cellular connection; and
providing a WLAN interface for the mobile hotspot for use as the virtual WLAN connection by a network protocol stack executed at the user equipment in association with the second subscription.

6. The method of claim 5,
wherein the one or more processes communicate with a second mobile network operator using a data path that includes the WLAN interface and the first cellular connection.

7. The method of claim 6, further comprising:
establishing, for the one or more processes, a secure tunnel with the second mobile network operator via the WLAN interface and the first cellular connection.

8. The method of claim 6, wherein providing the WLAN interface comprises providing the WLAN interface as a set of one or more application programming interfaces (APIs) for an operating system executing at the user equipment.

9. The method of claim 5, further comprising:
monitoring, at the user equipment, at least one cellular signal quality parameter of the first cellular connection; and
determining, at the user equipment, at least one equivalent WLAN signal quality parameter for a virtual WLAN access point representing the first cellular connection based on the at least one cellular signal quality parameter.

10. The method of claim 9, further comprising:
monitoring a WLAN modem of the user equipment to identify one or more second WLAN access points available to connect to the user equipment;
determining at least one WLAN signal quality parameter of each of the identified one or more second WLAN access points;
selecting one of the one or more second WLAN access points or the virtual WLAN access point for establishing a WLAN connection for the user equipment based on the WLAN signal quality parameters of the one or more second WLAN access points and the at least one equivalent WLAN signal quality parameter for the virtual WLAN access point; and
wherein virtualizing the first cellular connection as the virtual WLAN connection comprises virtualizing the first cellular connection responsive to selecting the virtual WLAN access point for establishing the WLAN connection.

11. The method of claim 9, further comprising:
displaying a graphical representation of the at least one equivalent WLAN signal quality parameter at a display screen of the user equipment.

12. The method of claim 5, wherein:
virtualizing the first cellular connection as the virtual WLAN connection comprises virtualizing the first cellular connection as the virtual WLAN connection responsive to at least one of: the user equipment being unable to establish a second cellular connection with a second mobile network operator using the second subscription; or use of the second cellular connection by the one or more processes being impracticable for reasons of cost or power consumption.

13. The method of claim 5, wherein:

the first cellular connection comprises a cellular connection established using at least one of: a Long Term Evolution (LTE) radio access technology (RAT), a Fifth Generation New Radio (5G NR) radio access technology, a Global System for Mobility (GSM) radio access technology, and a Universal Mobile Telecommunications System (UMTS) radio access technology; and the virtual WLAN connection comprises a wireless connection established using at least one of: a WiFi radio access technology, a Bluetooth radio access technology, and an Ultra-Wide Band radio access technology.

14. A user equipment, comprising:

a radio frequency (RF) modem configured to wirelessly communicate with at least one mobile network operator;

a wireless local area network (WLAN) modem configured to wirelessly communicate with at least one WLAN access point;

a processor coupled to the RF modem and the WLAN modem; and at least one memory storing executable instructions, the executable instructions configured to manipulate at least one of the processor and the RF modem to:

establish a first cellular connection with a first mobile network operator based on a first subscription represented by a first subscriber identity; and virtualize the first cellular connection as a virtual WLAN connection for use by one or more processes executed by the processor for a second subscription represented by a second subscriber identity by establishing a mobile hotspot at the user equipment for the first cellular connection; and providing a WLAN interface for the mobile hotspot for use as the virtual WLAN connection by a network protocol stack executed at the user equipment in association with the second subscription.

15. The user equipment of claim 14, wherein the one or more processes are to communicate with a second mobile network operator using a data path that includes the WLAN interface and the first cellular connection.

16. The user equipment of claim 15, wherein the executable instructions further comprise executable instructions to manipulate at least one of the processor or the RF modem to:

establish, for the one or more processes, a secure tunnel with the second mobile network operator via the WLAN interface and the first cellular connection.

17. The user equipment of claim 14, wherein the executable instructions further comprise executable instructions to manipulate at least one of the processor or the RF modem to:

monitor at least one cellular signal quality parameter of the first cellular connection; and determine at least one equivalent WLAN signal quality parameter for a virtual WLAN access point representing the first cellular connection based on the at least one cellular signal quality parameter.

18. The user equipment of claim 17, wherein the executable instructions further comprise executable instructions to manipulate at least one of the processor or the RF modem to:

monitor a WLAN modem of the user equipment to identify one or more second WLAN access points available to connect to the user equipment;

determine at least one WLAN signal quality parameter of each of the identified one or more second WLAN access points;

select one of the one or more second WLAN access points or the virtual WLAN access point for establishing a WLAN connection for the user equipment based on the WLAN signal quality parameters of the one or more second WLAN access points and the at least one equivalent WLAN signal quality parameter for the virtual WLAN access point; and wherein the first cellular connection is virtualized as the WLAN connection responsive to selection of the virtual WLAN access point for establishing the WLAN connection.

19. The user equipment of claim 17, further comprising:

a display screen configured to display a graphical representation of the at least one equivalent WLAN signal quality parameter.

20. The user equipment of claim 14, wherein the first cellular connection is virtualized as the virtual WLAN connection responsive to a second cellular connection with a second mobile network operator using the second subscription being either unavailable or impractical for use.

21. The user equipment of claim 14, further comprising at least one of:

a first integrated circuit (IC) card interface configured to receive a first IC card storing a representation of the first subscriber identity; and a second IC card interface configured to receive a second IC card storing a representation of the second subscriber identity.

* * * * *